(No Model.)
C. WRIGHT
Sheet-Metal Joints.
No. 228,240. Patented June 1, 1880.
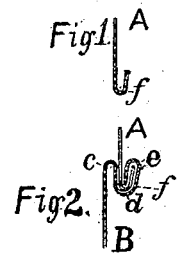
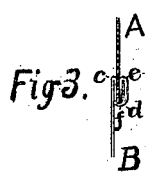
Witnesses
Wm Zimmerman
C H Wood
Inventor.
Christopher Wright
By Gridley & Co
Attys

UNITED STATES PATENT OFFICE.

CHRISTOPHER WRIGHT, OF CHICAGO, ILLINOIS, ASSIGNOR TO THE CHICAGO STAMPING COMPANY, OF SAME PLACE.

SHEET-METAL JOINT.

SPECIFICATION forming part of Letters Patent No. 228,240, dated June 1, 1880.

Application filed April 12, 1880. (No model.)

*To all whom it may concern:*

Be it known that I, CHRISTOPHER WRIGHT, of Chicago, in the county of Cook and State of Illinois, have invented certain new and useful Improvements in Sheet-Metal Joints; and I hereby declare the following to be a full, clear, and exact description thereof, which will enable others skilled in the art to which my invention appertains to make and use the same, reference being had to the accompanying drawings, which form a part hereof, and in which—

Figure 1 represents an end view of one edge of a piece of sheet metal constituting the male part of my improved joint. Fig. 2 represents the same view of the female part of said joint with the male part placed therein, and Fig. 3 represents an end view of the completed joint.

Like letters of reference indicate like parts.

The object of my invention is to form a practically-tight mechanical joint between the overlapping edges of thin sheets of metal as applied to the manufacture of the bodies of sheet-metal cans, coal-hods, stove-pipe joints, or other articles of manufacture; and my invention consists in a joint for uniting two pieces or edges of sheet metal without the use of solder, constructed as hereinafter more particularly described.

In the drawings, A represents a piece of sheet metal, one edge of which is turned in the form of a hook, $f$, which constitutes the male part of the joint.

B represents the other edge of the same piece of sheet metal, or one edge of another piece, which is turned in an opposite direction, so as to form a hook similar to $f$, as shown at $e$. The edge of the piece B, with its hook $e$, is then bent, by means of suitable dies prepared for that purpose, in the form of the letter S, so as to form the double hook $c\ d$, and when so formed constitutes the female part of the joint. The edge or hook $f$ of the piece A is then slipped longitudinally within the hooks $d$ and $e$ of the piece B, when said parts are closed upon each other by compressing the flat sides of the joint firmly against each other, thereby forming a practically-tight mechanical joint without the use of solder, and which cannot be sprung or pulled apart by pressure from the inside or pushed apart or opened by outside pressure, and cannot be parted except by cutting or tearing the metal.

Having thus described my invention, what I claim as new, and desire to secure by Letters Patent, is—

A joint for uniting the edges of sheet metal, consisting of the hook $f$ and the hooks $c\ d\ e$, the hook $f$ being clamped within the hooks $d$ and $e$, all being compressed together as shown and described.

CHRISTOPHER WRIGHT.

Witnesses:
C. S. MELCHER,
JOHN BARROW.